United States Patent
Effern et al.

(10) Patent No.: US 9,552,162 B2
(45) Date of Patent: Jan. 24, 2017

(54) SPLITTING-BASED APPROACH TO CONTROL DATA AND STORAGE GROWTH IN A COMPUTER SYSTEM

(71) Applicants: Arndt Effern, Sinsheim (DE); Steffen Siegmund, St. Leon-Rot (DE); Ralf Stauffer, Schwegenheim (DE); Guenter Briam, Wiesloch (DE)

(72) Inventors: Arndt Effern, Sinsheim (DE); Steffen Siegmund, St. Leon-Rot (DE); Ralf Stauffer, Schwegenheim (DE); Guenter Briam, Wiesloch (DE)

(73) Assignee: SAP SE, Walldorf (DE)

( * ) Notice: Subject to any disclaimer, the term of this patent is extended or adjusted under 35 U.S.C. 154(b) by 114 days.

(21) Appl. No.: 14/563,455

(22) Filed: Dec. 8, 2014

(65) Prior Publication Data

US 2016/0162197 A1  Jun. 9, 2016

(51) Int. Cl.
| | |
|---|---|
| *G06F 12/00* | (2006.01) |
| *G06F 3/06* | (2006.01) |
| *G06F 13/00* | (2006.01) |
| *G06F 13/28* | (2006.01) |

(52) U.S. Cl.
CPC ............ *G06F 3/0608* (2013.01); *G06F 3/064* (2013.01); *G06F 3/0644* (2013.01); *G06F 3/0673* (2013.01)

(58) Field of Classification Search
CPC ...... G06F 3/0608; G06F 3/064; G06F 3/0644; G06F 3/0673
See application file for complete search history.

(56) References Cited

U.S. PATENT DOCUMENTS

| | | | | |
|---|---|---|---|---|
| 5,530,826 | A  * | 6/1996 | Higuchi | G11C 8/20 711/100 |
| 6,775,676 | B1 | 8/2004 | Briam et al. | |
| 7,293,035 | B2 * | 11/2007 | Hsu | H03M 7/3084 |
| 7,461,097 | B2 | 12/2008 | Stahl et al. | |
| 2009/0013129 | A1 * | 1/2009 | Bondurant | G06F 3/0608 711/115 |
| 2009/0037439 | A1 | 2/2009 | Effern et al. | |
| 2009/0259675 | A1 * | 10/2009 | Hamilton | G06F 17/30153 |
| 2011/0113016 | A1 * | 5/2011 | Gruhl | H03M 7/30 707/661 |
| 2011/0185149 | A1 * | 7/2011 | Gruhl | G06F 3/0608 711/206 |
| 2012/0089566 | A1 | 4/2012 | Effern et al. | |
| 2014/0095439 | A1 * | 4/2014 | Ram | G06F 17/30159 707/640 |

* cited by examiner

*Primary Examiner* — Mark Giardino, Jr.
(74) *Attorney, Agent, or Firm* — Brake Hughes Bellermann LLP (57) ABSTRACT

In one general aspect, a method can include receiving initial content including a total number of data units for storage, identifying a number of data chunks, identifying a size for each of the data chunks, the size for each data chunk indicative of a number of data units for inclusion in the respective data chunk. The method can further include splitting the initial content into the number of data chunks, each data chunk including a portion of the total number of data units included in the initial content, the portion of the total number of data units based on the size of the data chunk, storing each of the data chunks in memory, and compressing the data chunks included in the memory.

20 Claims, 9 Drawing Sheets

| Number of Data Units ([a ... z] = 26) | | | | | |
|---|---|---|---|---|---|
| Exemplary Content Portion size | 16 | 8 | 4 | 2 | 1 |
| Number of Content Portions | 1 | 2 | 4 | 8 | 16 |
| Maximum Number of Unique Data Unit Combinations per Content Portion | 4.36E+22 | 2.09E+11 | 456,976 | 676 | 26 |
| Maximum Number of Unique Data Unit Combinations Across All Content Portions | 4.36E+22<br>_208a_ | 4.18E+11<br>_208b_ | 1,827,904<br>_208c_ | 5408<br>_208d_ | 416<br>_208e_ |

| Distinct Entry Values | Distinct Values column 1 | Distinct Values column 2 | Sum of distinct values in columns 1 and 2 *412* |
|---|---|---|---|
| 8 | 2 *408* | 4 *410* | 6 *414* |

FIG. 4A

| Entry Value (including seven or more digits) | Column 1 *404* (including four digits) | Column 2 *406* (including four digits) |
|---|---|---|
| 101,500 *402a* | 0010 | 1500 |
| 100,450 *402b* | 0010 | 0450 |
| 101,400 *402c* | 0010 | 1400 |
| 9,901,400 *402d* | 0990 | 1400 |
| 9,900,450 *402e* | 0990 | 0450 |
| 9,901,500 *402f* | 0990 | 1500 |
| 100,300 *402g* | 0010 | 0300 |
| 9,900,300 *402h* | 0990 *418* | 0300 *420* |

| | Number of Digits in Column 1 *534* | Number of Digits in Column 2 *536* | Number of Distinct Values in Column 1 *502* | Number of Distinct Values in column 2 *504* | Sum of Distinct Values in Column 1 and Column 2 *512* | Size (kbytes) |
|---|---|---|---|---|---|---|
| 506a | 12 | 0 | 1,196,814 *508* | 0 | 1,196,814 | 17,352 *524* |
| 506b | 11 | 1 | 1,196,814 *516* | 10 *510* | 1,196,824 *518* | 17,940 *526* |
| 506c | 10 | 2 | 1,182,009 | 10 *520* | 1,196,824 *522* | 18,207 |
| 506d | 9 | 3 | 1,045,990 | 100 | 1,182,109 | 16,916 |
| 506e | 8 | 4 | 402,970 | 1000 | 1,046,990 | 9,925 |
| 506f | 7 | 5 | 42,954 *514* | 10,000 | 412,970 | *6,760* |
| 506g | 6 | 6 | 4,299 | 99,999 *528* | 142,953 *530* | *532* |
| | | | | 698,176 | 702,475 | 13,317 |

602 — CREATE TABLE tab (metric_value BIGINT); -- obsolete table creation

604 — CREATE TABLE tab_split (metric_value_1 BIGINT; metric_value_2 BIGINT); -- split table 606 — CREATE VIEW tab (metric_value BIGINT)
   608
   AS SELECT metric_value_1 * $10^x$ + metric_value_2 AS metric_value FROM tab_split; -- merge view

SPLITTING-BASED APPROACH TO CONTROL DATA AND STORAGE GROWTH IN A COMPUTER SYSTEM

TECHNICAL FIELD

This description relates to data compression.

BACKGROUND

A computing system can include a database that stores data in a storage on persistent media, such as a disk drive. In addition or in the alternative, the computing system can store data fully or partially (buffered) in main memory included in the computing system. The amount of data stored in the main memory and/or stored in persistent media can determine the cost of storage.

Various technologies exist that can control storage cost. The technologies can include, but are not limited to, data archiving, data aggregation, data compression or a combination of the various technologies. In some cases, one or more compression algorithms can compress the data stored in a database in order to maximize the number of database records that can be included in a given amount of data storage space. In some cases, however, the data compression can result in the loss of some of the data or in a reduction in the accuracy of the stored data. If the loss of some data or a reduction in data accuracy is unacceptable, data compression rates for the data will then be limited as the data compression rates are dependent on incidences of equal data values within a range of data to be compressed. It may be desirable, therefore, to further increase the amount of data that can be stored in a given amount of data storage space without losing any of the data and/or without reducing the accuracy of the stored data.

SUMMARY

According to one general aspect, a method includes receiving initial content including a total number of data units for storage, identifying a number of data chunks, identifying a size for each of the data chunks, the size for each data chunk indicative of a number of data units for inclusion in the respective data chunk, splitting the initial content into the number of data chunks, each data chunk including a portion of the total number of data units included in the initial content, the portion of the total number of data units based on the size of the data chunk, storing each of the data chunks in memory, and compressing the data chunks included in the memory.

Implementations may include one or more of the following features. For instance, storing each of the data chunks can include storing each of the data chunks in a column associated with a respective data chunk, each column including a plurality of data chunks of the identified data chunk size for the data chunk associated with the respective column. Compressing the plurality of data chunks can include, for each column, compressing the plurality of data chunks included in the column. The memory can be an in-memory database. The method can further include creating a table view for the data chunks. The method can further include accessing each data chunk for the initial content; and combining each data chunk for the initial content, using the table view, to generate the initial content. A sum of the number of data units included in each data chunk can be equal to the total number of data units included in the initial content. Compressing the data chunks can include identifying duplicate data chunks, storing a single data entry for each duplicate data chunk, and storing an additional data entry indicative of a position in the memory for each duplicate data chunk. Identifying a number of data chunks can be based on determining that the number of data chunks results in a minimum amount of storage in the memory.

In another general aspect, a computer program product is tangibly embodied on a non-transitory computer-readable storage medium and includes instructions that, when executed by at least one computing device, are configured to cause the at least one computing device to receive initial content including a total number of data units for storage in memory, identify a number of data chunks, identify a size for each of the data chunks, the size for each data chunk indicative of a number of data units for inclusion in the respective data chunk, split the initial content into the number of data chunks, each data chunk including a portion of the total number of data units included in the initial content, the portion of the total number of data units based on the size of the data chunk, store each of the data chunks in memory, and compress the plurality of data chunks included in the memory.

Implementations may include one or more of the following features. For instance, the instructions configured to cause the at least one computing device to store each of the data chunks can include instructions configured to cause the at least one computing device to store each of the data chunks in a column associated with a respective data chunk, each column including a plurality of data chunks of the identified data chunk size for the data chunk associated with the respective column. The instructions configured to cause the at least one computing device to compress the plurality of data chunks can include instructions configured to cause the at least one computing device to, for each column, compress the plurality of data chunks included in the column. The memory can be an in-memory database. The instructions can be further configured to cause the at least one computing device to create a table view for the data chunks. The instructions can be further configured to cause the at least one computing device to access each data chunk for the initial content, and combine each data chunk for the initial content, using the table view, to generate the initial content. A sum of the number of data units included in each data chunk can be equal to the total number of data units included in the initial content. The instructions for compressing the data chunks can cause the at least one computing device to identify duplicate data chunks, store a single entry for each duplicate data chunk, and store an additional data entry indicative of a position in the memory for each duplicate data chunk.

In another general aspect, a database management system includes a splitting module configured to split initial content into a number of data chunks, each data chunk including a portion of a total number of data units included in the initial content, the portion of the total number of data units based on a size of the data chunk, the size of the data chunk indicative of a number of data units for inclusion in the data chunk, a memory configured to store each of the data chunks, and a compression module configured to compress the data chunks included in the memory.

Implementations may include one or more of the following features. For instance, the memory can be further configured to store each of the data chunks in a column associated with a respective data chunk, each column including a plurality of data chunks of the identified data chunk size for the data chunk associated with the respective column, and for each column, compress the plurality of data chunks included in the column. The system can further include a decompression module configured to create a table view for the data chunks. The system can further include an assembly module configured to access each data chunk for the initial content, and combine each data chunk for the initial content, using the table view, to generate the initial content. Compressing the data chunks can include identifying duplicate data chunks, storing a single data entry for each duplicate data chunk, and storing an additional data entry indicative of a position in the memory for each duplicate data chunk.

The details of one or more implementations are set forth in the accompanying drawings and the description below. Other features will be apparent from the description and drawings, and from the claims.

The details of one or more implementations are set forth in the accompanying drawings and the description below. Other features will be apparent from the description and drawings, and from the claims.

DETAILED DESCRIPTION

The storing of information and data can utilize storage space included in a storage system or repository. Example implementations of a storage system can include, but are not limited to, semiconductor memory components, magnetic disks such as floppy disks and/or hard disk drives, optical storage devices such as compact disks (CDs) or digital video disks (DVDs), flash drives, solid state disk drives, and tape storage systems.

As the amount of data being stored increases so does the amount of storage space needed to store the data as well as a cost of procurement, operating and maintaining a storage system. In order to save on the costs associated with a storage system, one or more methods can be used to manage and control the amount of storage space used by the information and data being stored in the storage system. Example storage reduction methods can include, but are not limited to, data archiving (e.g., moving portions of data for storage from more expensive storage systems to less expensive storage systems), data aggregation (e.g., data warehousing which can integrate data from multiple sources into a central repository of data), and data compression. The example storage reduction methods can be used individually or in combination. In some implementations, advantages of data compression as a storage reduction method can include, but are not limited to, the performing of data compression without the need for information about data semantics, and without the loss of accuracy or data access speed. In some cases, however, data compression rates can be dependent on a the number of data values that are equal or equivalent (the number of occurrences of the same data values) and, as such, can vary. For example, data compression rates can increase as a number of available equal or equivalent data values increases. Data compression rates can decrease as a number of available equal or equivalent data values decreases (i.e. data values become more distinct and diverse).

A storage system or data repository can include many different types and forms of data. The data can include, but is not limited to, business data, monitoring data, and master data. The data can be current data and/or historical data. In one example, historical data can be data related to technical systems for infrastructure components (e.g., processors, memory, input/output control, databases, operating systems, virtualization systems, etc.) used by an enterprise. The enterprise can gather the historical data for the infrastructure components on a time basis (e.g., once per minute, once per hour, once per day). The historical data can be used to identify and help solve problems that may occur in the technical systems for the infrastructure components. The historical data can be used for root cause analysis when trying to identify a root cause of a fault or problem with the technical systems for the infrastructure components. For example, an enterprise can use the historical data to identify, locate, and analyze a fault or problem with the technical systems for the infrastructure components. The historical data can include, but is not limited to, data indicative of a consumption of central processing unit (CPU) cycles, system input/output rates, system response times, and memory usage (e.g., memory consumption data for a system).

In one example, business data can be data related to the day to day business transactions for the enterprise. In another example, master data can be data used by an enterprise on a daily basis for use in, for example, running day to day operations. A computing system can access data included in a main memory database much faster than data included in an on-disk database system, however, storage space in main memory may come at a higher cost than that of on-disk storage space. In some implementations, it may be desirable to relocate data, which is no longer relevant for day to day operations, to storage media whose cost is less than the cost of main memory in order to reduce the amount of memory needed by a database or in order to free up space for more relevant data to be stored in the database.

In some cases, the data can be aggregated. Aggregating data can include finding an average data value for a particular time frame. For example, data captured or gathered every minute can be aggregated into one or more data records that represent data gathered every hour. Aggregating the data can include summing together all of the data gathered within a time frame (e.g., data gathered every minute for one hour (sixty minutes)) and finding the average data value for the time frame (e.g., dividing the sum by sixty). Aggregating the data, however, results in the loss of detailed information during the time frame because minimum and maximum data values (e.g., peak values) that may have been captured during the time frame are lost or averaged out.

In some cases, data can be rounded. For example, the number of bits, bytes, or digits needed to represent a data value can be reduced, resulting in fewer bits, bytes, or digits needed for storage of a data value. Reducing the number of bits, bytes, or digits used to represent a data value can decrease the accuracy of the data value.

In some implementations, it may be desirable to compress data such that a sufficient amount of detail and accuracy of the data is stored in a repository. The data can include a plurality of data units, where a data unit is a single (atomic) data entity for a data type. The data types can include, but are not limited to, a character (e.g., an uppercase character (letter) in a range from [A-Z], lowercase character (letter) in a range from [a-z]), a decimal digit (e.g., in a range from [0-9]), a hexadecimal digit (e.g., in a range from [0-F]), and a Boolean digit (e.g., a "1" or a "0").

In some implementations, a repository can include an unordered set of storage elements that include data units of a similar data type (e.g., all characters). The storage elements can include, but are not limited to, a program variable array or a collection. In some implementations, a repository can include an ordered set of storage elements that include data units of a similar data type (e.g., all decimal digits). The storage elements can include, but are not limited to, a database table column and a spreadsheet application column.

A repository can include initial data content stored in a storage element of a particular element size (e.g., column width). The initial data content can include a combination of data units that form individual data values of the given value length. For example, a combination of characters can form a character string value. In another example, a combination of decimal digits can form a number value. For example, a combination of Boolean digits can form a binary string value. This results in a maximum number of data unit combinations dependent on the particular storage element size for the initial data content.

The initial data content can be split (divided or portioned) into pieces or data chunks, where a data chunk can also be referred to as a content portion. In some cases, the initial content can be split into equal portions. In some cases, the data chunks can be split into unequal portions. In some cases, the data chunks can be split into some equal portions and into some unequal portions. For example, splitting initial data content that is a character string value can include splitting the character string into multiple substrings. A minimum content portion size (e.g., length) can be equal to one. A maximum content portion size (e.g., length) can be equal to the size (e.g., length) of the storage element.

In some implementations, a database management system can apply one or more compression processes, algorithms, or mechanisms to compress the data before storing the data in a repository. Prior to the database management system's compression and storage of the data, the original gathered or captured data can be processed or otherwise manipulated in a manner that preserves the accuracy and details of the data while preparing the data in such a way that it is presented in a beneficial manner to the compression algorithms. In addition, the accuracy of the measurements of the data (the precision or resolution of the data) can be preserved while using the compression algorithms and mechanisms provided by the database management system in order to reduce the overall amount of memory needed to store the data in the repository.

In some implementations, data stored in a database can be stored in one or more columns. The database management system can provide a compression algorithm that capitalizes on the column-based storage format. For each column included in the database, the database management system can identify duplicate data entries included in the column as data entries that include the same data value. Instead of storing each duplicate data entry separately, or individually the database management system can store a single data entry for the duplicate data entries along with an additional entry (e.g., a map) indicative of a position in the database (e.g., a pointer to the position in the database) for each of the individual duplicate data entries. For a large number of data entries that may have many duplicate data entries, this compression algorithm can result in less storage space for the data entries while maintaining the accuracy and details of each data entry. For example, an in-memory, column-oriented, relational database management system (e.g., High-Performance Analytic Appliance (HANA) by SAP®) can apply one or more compression processes, algorithms, or mechanisms to compress the data before storing the data in an in-memory database.

The data can be prepared prior to compression by the database management system to capitalize on the use of less memory space to store duplicate column entries. In some implementations, a data can be split into two or more data entries (chunks) for storage in memory. The fewer the digits included in a data chunk the higher the probability that there will be duplicate data chunks stored in the memory. The more duplicate data chunks that are stored in the memory, the higher the compression rate for the data stored in the memory.

Initial data content can include a combination of data units that form individual data values of the given size. For example, a two-digit binary data value can have one of four possible data entries (00, 01, 10, 11) and a one in four chance or probability of being the same as a previous two-digit value. A three-digit binary data value can have one of eight possible data entries (000, 001, 010, 011, 100, 101, 110, 111) and a one in eight chance or probability of being the same as a previous three-digit value. Splitting data entries that have a number of digits for a data value into two or more data entries (two or more chunks of data) that each have less than the number of digits for a value can increase the compression rate for the data entries resulting in the use of less memory than before splitting the initial data entries.

Figure 1:
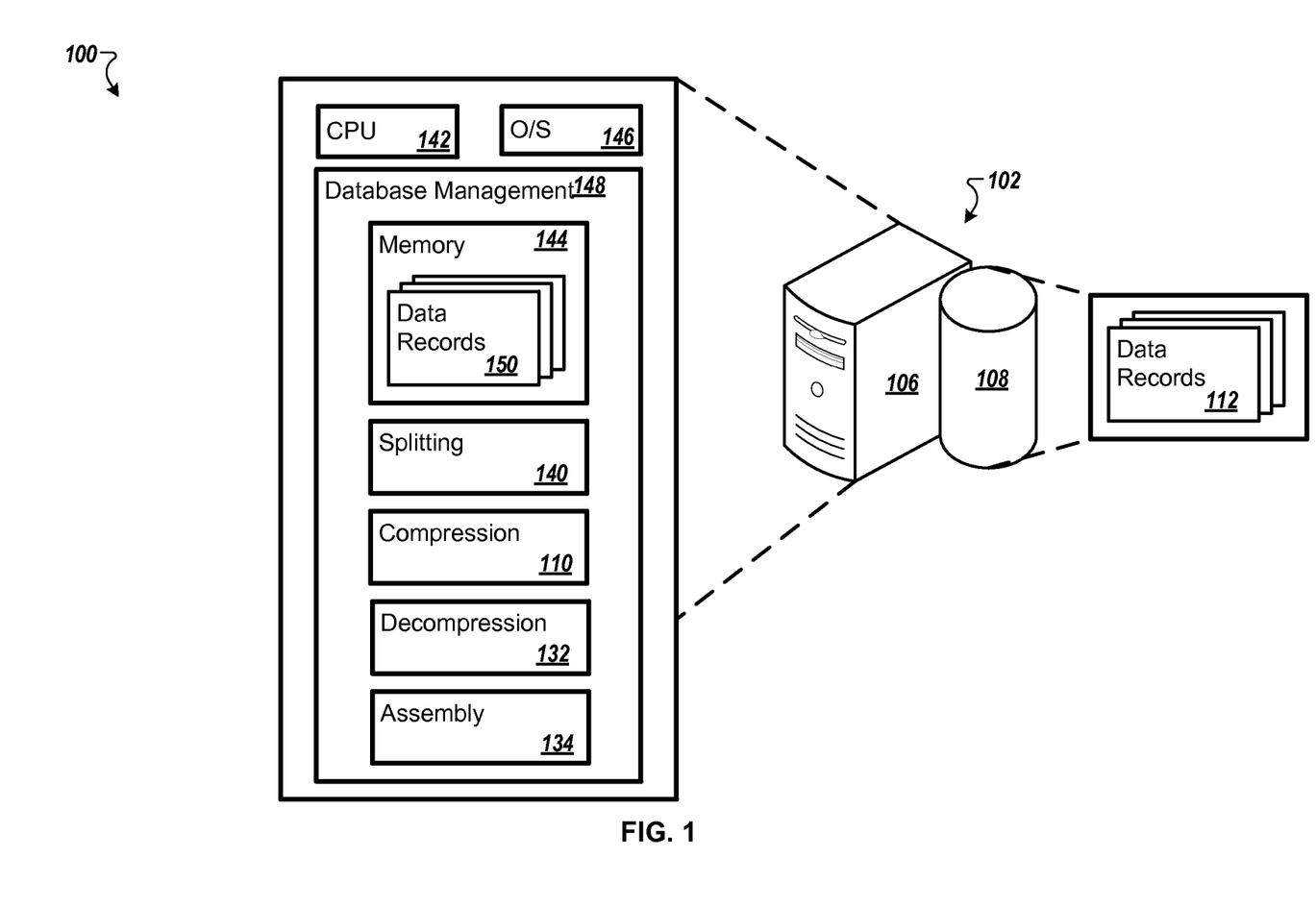
FIG. 1 is a diagram of an example system that can gather and store data for an enterprise.

FIG. 1 is a diagram of an example system 100 that can gather and store data for an enterprise. The system 100 can include one or more computer systems (e.g., computer system 102). The computer system 102 can include one or more computing devices 106 and one or more computer-readable storage devices (e.g., database 108). The database 108 can provide persistent storage capabilities for the computing device 106. Though FIG. 1 shows a computer system 102, the system 100 may include additional computer systems. The computer systems may be included as part of larger systems for managing the production or handling of goods or services. For example, a computer system may be part of or included in a larger machine or system. The computer systems may be located in a same location or in different locations.

The computing device 106 can include one or more processors (e.g., CPU 142), and one or more memory devices (e.g., memory 144). The computing device 106 can execute an O/S 146. In some implementations, the computing device 106 can represent multiple computing devices (e.g., servers) working together to perform server-side operations. The memory 144 can be configured as an in-memory or cached database that includes all or some data records 150 and that is part of a database management system 148. The data records 150 can be stored in a database included in the in-memory database or in a main memory buffer or cache. In some implementations, the data records 150 can be stored in a column-oriented manner in the in-memory database. In addition or in the alternative, data records 112 can be stored in the database 108. In some implementations, the data records 150 can be stored in a column-oriented manner in the database 108. The database management system 148 can control and manage the data records 112 included in the database 108.

A splitting module 140 can include one or more splitting algorithms for splitting the data records 150 and the data records 112. As described herein, splitting data included in a data record into smaller values (chunks) can result in a higher probability for duplicate data values to occur. A compression module 110 can include one or more compression algorithms for compressing the data included in the database (e.g., an in-memory database, a database 108). As described, the one or more compression algorithms can compress the data based on determining duplicate data values included in the memory. The larger the number of duplicate data values, the higher the compression rate for the data when compressed by one or more algorithms included in the database management system 148.

A decompression module 132 can include one or more decompression algorithms that can decompress data by determining the smaller values (chunks) for a data record. The decompression module 132 can create a table view for a data record that includes split initial content in content portions. An assembly module 134 can include one or more assembly algorithms that can assemble data by summing or concatenating the smaller values (chunks) together to form the initial data value.

In some implementations, the splitting module 140 can be a separate module, application, or program executed by the computing device 106. In some implementations, the splitting module 140 can be included as part of the database management system 148. In some implementations, the compression module 110 can be a separate module, application, or program executed by the computing device 106. In some implementations, the compression module 110 can be included as part of the database management system 148. In some implementations, the decompression module 132 can be a separate module, application, or program executed by the computing device 106. In some implementations, the decompression module 132 can be included as part of the database management system 148. In some implementations, the assembly module 134 can be a separate module, application, or program executed by the computing device 106. In some implementations, the assembly module 134 can be included as part of the database management system 148.

Figure 2A:
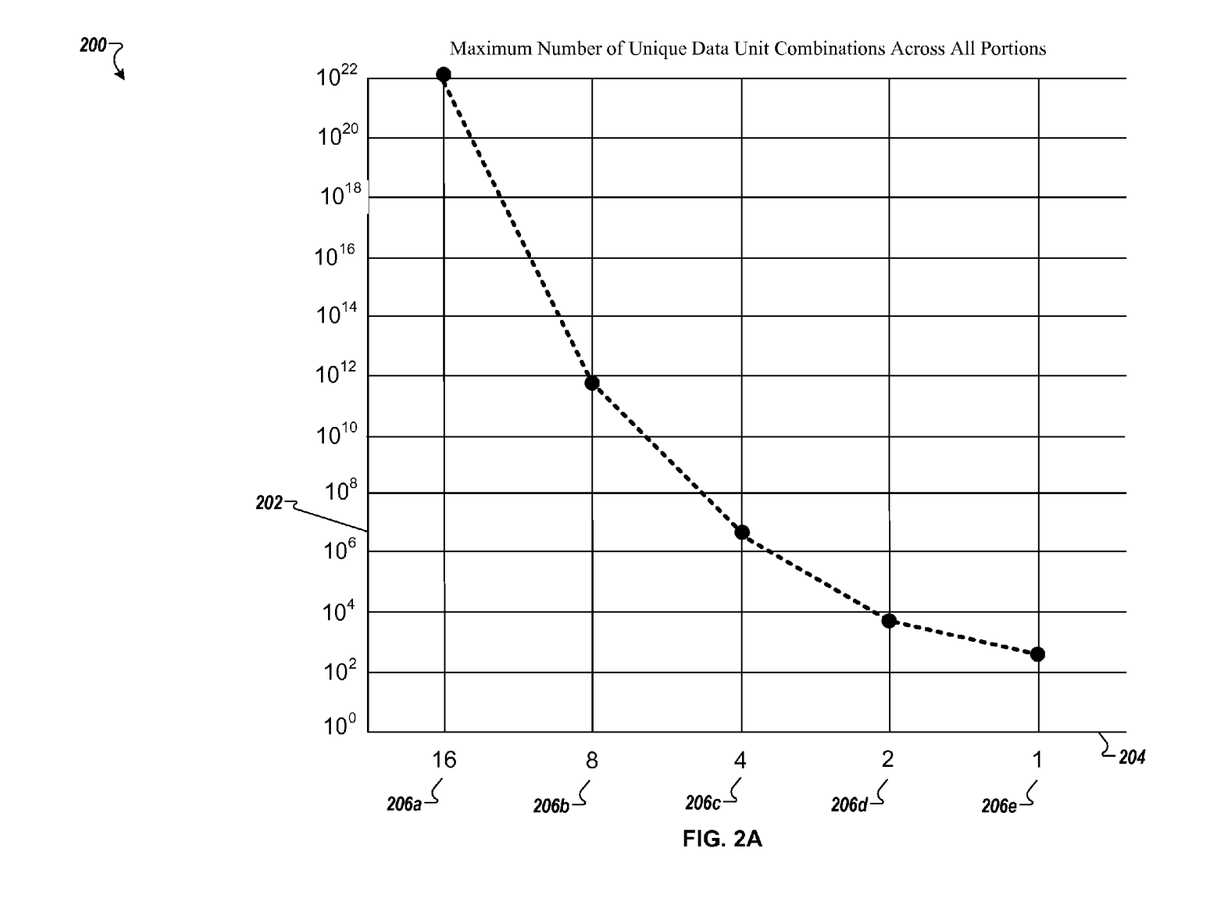
FIG. 2A is an example graph of a maximum number of unique data unit combinations across all content portions for initial content of a size (e.g., length) that includes a combination of sixteen data units.

FIG. 2A is an example graph 200 of a maximum number of unique data unit combinations (a first axis 202) across all content portions (a second axis 204) for initial content of a size (e.g., length) that includes a combination of sixteen data units. A content portion used to represent the initial content can be equal to or smaller than a length of a storage element that could store the initial content.

Figure 2B:
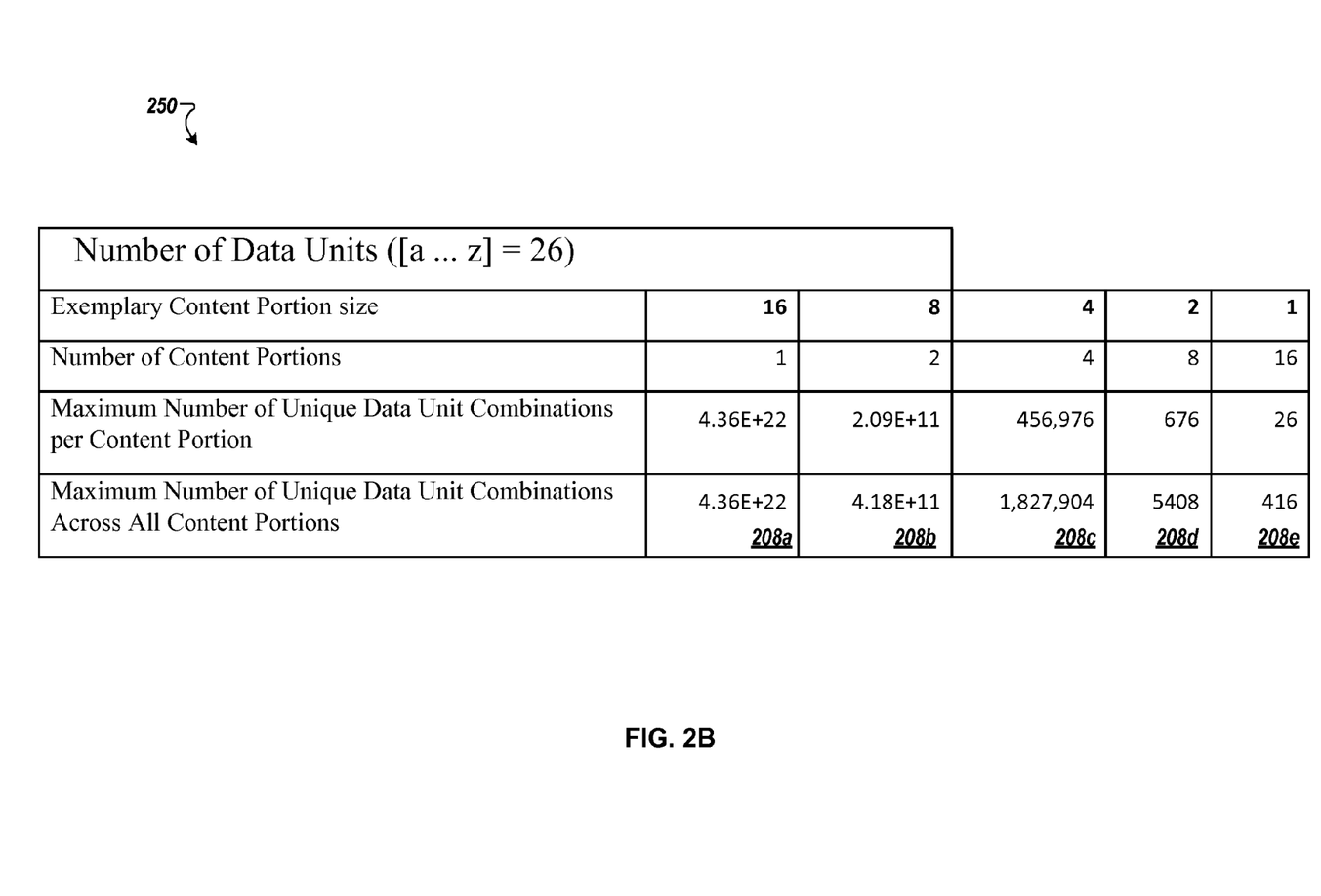
FIG. 2B is an example table that shows content portion values as shown on the graph for respective content portions 206a-e.

FIG. 2B is an example table 250 that shows content portion values 208a-e as shown on the graph 200 for content portions 206a-e, respectively.

The graph 200 shows that as the size of the content portion increases, the maximum number of distinct data chunks also increases. As described, the smaller the content portion (the smaller the size of a data chunk) the higher the compression rate of the data chunks as there are fewer unique or distinct data chunks (and consequently the possibility of more duplicate data chunks).

Referring to FIG. 2A, in some implementations, the example graph 200 can show the maximum number of distinct or unique values for a content portion included in a column of a database (a set of storage elements) after splitting up initial content that includes sixteen data units into content portions that include fewer data units. The second axis 204 shows a number of data units that can be included in the storage elements included in the column.

For example, the maximum number of distinct or unique values for a content portion that includes sixteen data units is at location 206a. The maximum number of distinct or unique values for a content portion that includes eight data units is at location 206b. The maximum number of distinct or unique values for a content portion that includes four data units is at location 206c. The maximum number of distinct or unique values for a content portion that includes two data units is at location 206d. The maximum number of distinct or unique values for a content portion that includes one data unit is at location 206e.

Columnar databases can exhibit excellent compression ratios if the columns included in a data record in the database include many duplicate values. By splitting a large column that includes a data entry into multiple columns that, as a whole, can include the same data entry, the number of duplicate data entries in a single columnar database column can increase without losing overall data accuracy.

For example, a data unit can be a number n of different characters, for example, uppercase characters (letters) in a range from [A-Z], where n=26. In this example, a storage element can be of data type char(1) and can include up to twenty-six distinct or unique values. An ordered set of storage elements can be of data type "char(2)" and can allow storage of combinations of characters in a range between [A-Z, A-Z], forming, for example, a character string. A maximum number of possible distinct or unique values for the char(2) data type can be 672 (26×26, an increase from the twenty-six distinct or unique values for the char(1) data type). An ordered set of storage elements can be of data type char(4) and can allow combinations of characters in a range between [A-Z, A-Z, A-Z, A-Z], forming a character string. A maximum number of possible distinct or unique values for the char(4) data type can be 456,976 (26×26×26×26, an increase from the 672 distinct or unique values for the char(2) data type).

Figure 3:
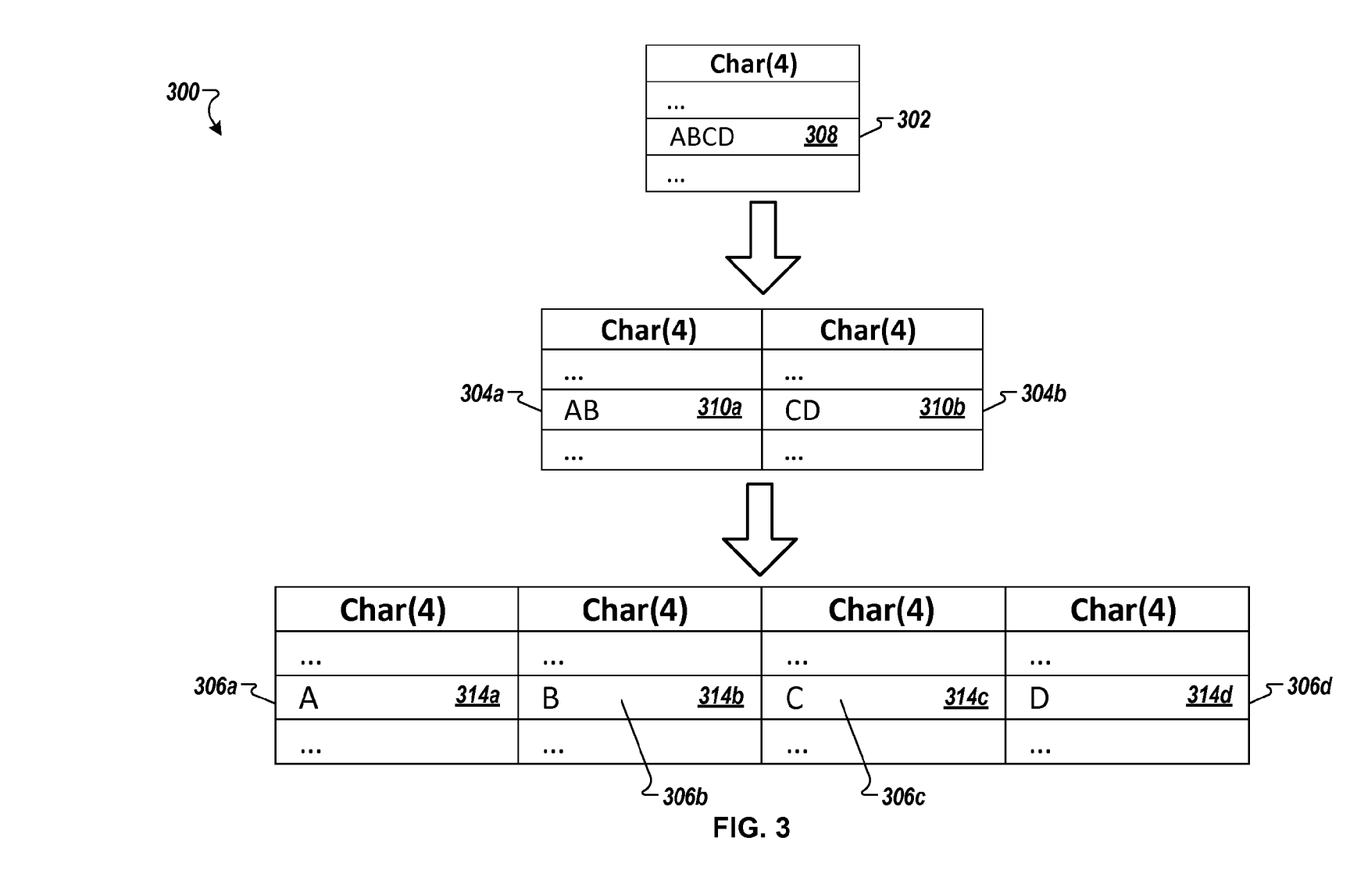
FIG. 3 is a block diagram that shows splitting initial content included into content portions into multiple content portions that can include data units of a particular data type in each of the content portions.

FIG. 3 is a block diagram 300 that shows splitting initial content 308 included in one content portion 302 into multiple content portions that can include data units of a particular data type in each of the content portions. Splitting up an initial content of length n into content portions of length n/2 can reduce the maximum number of possible distinct or unique data chunks (content portions) exponentially.

Referring to the above example, halving (dividing by two) the data length (size) of a data type char(4) (initial content 308) into two content portions 310a-b of the same data type, data type char(4) to include in a set of storage elements 304a-b can allow combinations of characters (letters) in a range between [A-Z, A-Z, A-Z, A-Z] (e.g., four-character initial content 308) to be divided into two data chunks 310a-b, each data chunk 310a-b being stored in storage elements 304a-b, respectively. Each data chunk 310a-b can allow combinations of characters (letters) in a range between [A-Z, A-Z] (e.g., two-character content portions 310a-b). Dividing the four-character data initial content 308 into two data chunks (two two-character content portions 310a-b) reduces the maximum number of possible distinct or unique values for the initial content 308 from 456,976 (26×26×26× 26) to 672 (26×26) distinct or unique values for each content portion 304a-b. Though the data type for the content portions 304a-b can remain the same as the data type for the initial content 308, dividing the four-character initial content 308 into two data chunks results in the two two-character content portions 310a-b, where each of the two-character content portions 310a-b has fewer data units than the four-character initial content 308.

Continuing, halving (dividing by two) the data length (size) of a data type char(4) (content portions 304a-b) can result in four content portions 314a-d of the same data type, data type char(4) to include in a set of storage elements 306a-d. Dividing the data length (size) of each content portion 304a-b can allow combinations of characters (letters) in a range between [A-Z, A-Z] (e.g., two-character content portions 310a-b) to each be divided into two data chunks, each data chunk 314a-d being stored in storage elements 306a-d, respectively. Each data chunk 314a-d can allow combinations of characters (letters) in a range between [A-Z] (e.g., one-character data content portions 314a-d.

Dividing each of the two-character content portions 310a-b into two data chunks (one-character content portions 314a-b and one-character data portions 314c-d, respectively) reduces the maximum number of possible distinct or unique values for the content portions 304a-b from 672 (26×26) to 26 distinct or unique values for each content portion 306a-d. As a result, the initial content 308 can be split into four content portions 314a-d. The initial content 308 can be split into content portions 314a-d for inclusion in the storage elements 306a-d, respectively.

In some implementations, a number of data units included in each data chunk (each content portion) may not be unequal resulting in content portions that are unequal in size. For example, if initial content includes five characters, splitting the initial into two data chunks can result in a first content portion with two characters and a second content portion with three characters (or vice versa).

As the initial content 308 is split into multiple content portions 310a-b and then into multiple content portions 314a-d, the maximum number of possible distinct or unique values for a content portion is reduced (decreases), increasing the probability of duplicate data chunks. As the probability of duplicate data chunks increases, so does the compression rate for the data chunks. The increase in the compression rate is based on the number of duplicate content portions (data chunks) and may not be directly dependent on the data type length of the storage element that includes the data chunk.

In some implementations, the initial content can be split into content portions that can be stored in multiple columns included in a database. For example, storage elements 304a-b can be included in a first column and a second column, respectively. For example, storage elements 306a-d can be included in a first column, a second column, a third column, and a fourth column, respectively. In some implementations, a database management system (e.g., the database management system 148) can create a table view for a data record that includes split initial content in content portions. The table view makes the splitting of the initial content transparent to an application or program interacting with/accessing the initial content in memory or a database. The table view combines (sums, concatenates) the content portions into a content (the initial content) that is provided to the function in the application or program that is accessing the initial content.

Figure 4A:
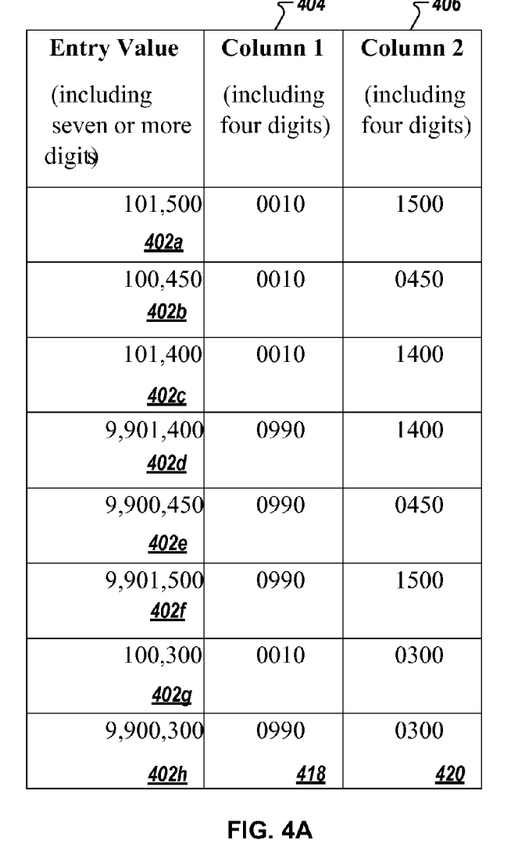
FIG. 4A shows example initial content that includes eight-data units and the result of splitting each of the initial content into two data chunks of four data units.

FIG. 4A shows example initial content 402a-h that includes eight-digit values (eight data units forming the initial content 402a-h) and the result of splitting each initial content 402a-h into two data chunks of four-digit values (two content portions each including four data units). The example of FIG. 4A, referring to FIG. 1, columns 404, 406 can be included in a table that can be stored in memory 144 as data records 150. In addition or in the alternative, the columns 404, 406 can be included in a table that can be stored in the database 108. In some implementations, each of the example initial content 402a-h can be split into two or more content portions that can be stored in storage elements included in a memory or other auxiliary storage medium or device.

In the example of FIG. 4A, a first data chunk (a first content portion) is stored in a storage element included in a first column 404 and a second data chunk (a second content portions) is stored in a storage element included in a second column 406. For example, initial content 402h (9,990,200) can be split into two four-digit (two four data unit) data chunks 418, 420. A first data chunk 418 (a first content portion) can include the first four digits (the first four data units (0990)) of the eight-digit (eight data unit) initial content 402h. A second data chunk 420 (a second content portion) can include the second four digits (the second four data units (0300)) of the eight-digit (eight data unit) initial content 402h.

Figure 4B:
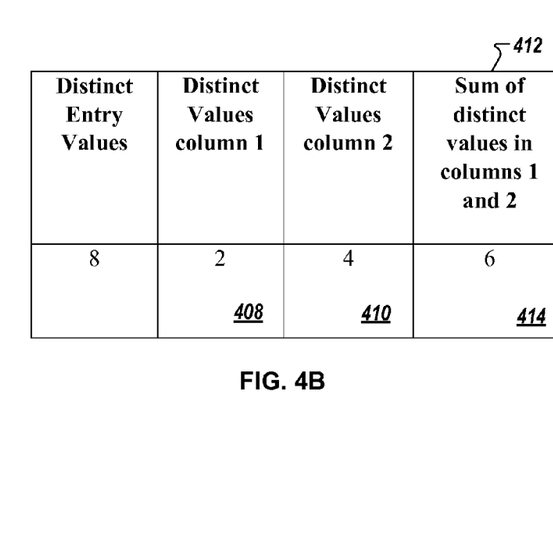
FIG. 4B shows a number of distinct content portions needed to represent split initial content.

FIG. 4B shows a number of distinct content portions (table entry 408) that can be stored in the first column 404 and a number of distinct content portions (table entry 410) that can be stored in the second column 406. Column 412 shows a total number of distinct and unique content portions needed to represent the initial content 402a-h when the initial content 402a-h are split into two four-digit (two four data unit) data chunks (table entry 414). As shown in FIG. 4B, fewer distinct and unique content portions are needed to represent the initial content 402a-h when the initial content 402a-h are split into two four-digit (two four data unit) data chunks and the results of the splits are stored in multiple (e.g., two) columns.

FIGS. 4A and 4B show an equal number of digits (data units) in each split chunk of data (each content portion). In some implementations, however, the number of digits (data units) included in each data chunk (each split data entry) may be unequal in size.

Figure 5:
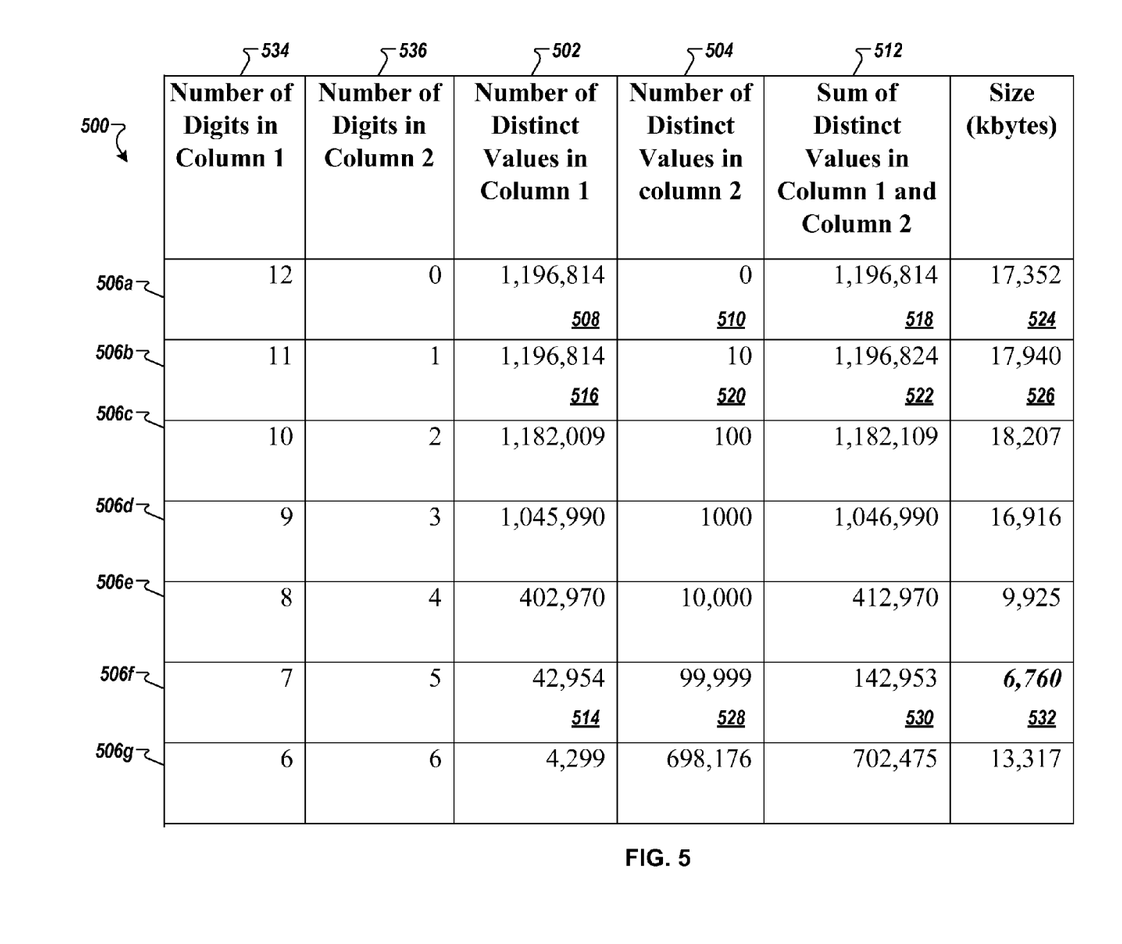
FIG. 5 is an example table showing information about initial content of a data type where the initial content is split into two content portions.

FIG. 5 is an example table 500 showing information about raw random data samples (initial content) of a data type where each the initial content is split into two data chunks or content portions) each of which is stored in a column. The example table 500 is for a raw randomly generated data sample of 1,198,399 data entries of an integer type that includes twelve digits (twelve data units), where the maximum data entry value does not exceed one billion ($10^{12}$). A database management system can split each raw data entry (each initial content) into two content portions or data chunks, where each content portion can be stored in a respective column (column 1 and column 2) of a database. Column 534 shows a value for the number of digits (the number of data units) that are used to represent the content included in column 1 of the table. Column 536 shows a value for the number of digits (the number of data units) that are used to represent the content included in column 2 of the table. In general, column 534 shows the number of digits (the number of data units) in a first data chunk (a first content portion) that is stored in column 1 and column 536 shows the number of digits (the number of data units) in a second data chunk (a second content portion) that is stored in column 2.

Column 502 of the table 500 lists the number of distinct content portions stored in a first column (column 1) of the database. Column 504 of the table 500 lists the number of distinct content portions stored in a second column (column 2) of the database.

Row 506a shows results of not splitting the raw data samples. As such, all of the twelve digits (data units) (the entire data entry or the initial content) is placed in column 1 resulting in 1,196,814 distinct or unique data chunks in column 1 (as indicated by table entry 508) and zero distinct or unique data chunks in column 2 (as indicated by table entry 510). Column 512 shows the sum of the distinct or unique data chunks for each column as a result of the splitting of the initial content. Table entry 518 shows the sum of the distinct or unique data chunks for each column as a result of not splitting the raw data sample of 1,198,399 data entries. Table entry 524 indicates a number of kilobytes (kB) of storage space needed to store the initial content.

Row 506b shows results of splitting the raw data samples (the initial content) into two data chunks, where a first data chunk includes eleven digits (data units) and a second chunk includes one digit (data unit). The splitting of the initial content in this manner results in 1,196,814 distinct or unique data chunks being placed in column 1 (as indicated by table entry 516) and ten distinct or unique data chunks being placed in column 2 (as indicated by table entry 520). Table entry 522 shows the sum of the distinct or unique data chunks for each column as a result of splitting the raw data sample of 1,198,399 data entries (the initial content) into two data chunks, where the first data chunk includes eleven digits (data units) and the second data chunk includes one digit (data unit). Table entry 526 indicates a number of kilobytes (kB) of storage space needed to store the initial content as split into the two data chunks and placed into the two columns.

In this case, the sum of the distinct or unique data chunks for each column as a result of splitting the raw data sample of 1,198,399 data entries (the initial content) into a first data chunk that includes eleven digits (data units) and a second data chunk that includes one digit (data unit) (table entry 522) is greater than the sum of the distinct or unique data chunks for each column as a result of not splitting the raw data sample of 1,198,399 data entries (the initial content) (table entry 518). In addition, the amount of kB of space needed to store the total number of distinct or unique data chunks as a result of splitting the initial content into an eleven digit data chunk and a one digit data chunk (table entry 526) is more than the amount of kB of space needed to store the total number of distinct or unique data chunks as a result of not splitting the initial content (table entry 524). This can occur because, though reduced in size by one digit (data unit), the reduction in the size of the data chunks in column 1 may not be significant enough to impact the compression rate for the data chunks in column 1.

Row 506f shows results of splitting the raw data sample of 1,198,399 data entries (the initial content) into a first data chunk that includes seven digits (data units) and a second data chunk that includes five digits (data units). The splitting of the initial content in this manner results in 42,954 distinct or unique data chunks being placed in column 1 (as indicated by table entry 514) and 99,999 distinct or unique data chunks being placed in column 2 (as indicated by table entry 528). Table entry 530 shows the sum of the distinct or unique data chunks for each column as a result of splitting the raw data sample of 1,198,399 data entries (the initial content) into two data chunks, where the first data chunk includes seven digits (data units) and the second data chunk includes five digits (data units). Table entry 532 indicates a number of kilobytes (kB) of space needed to store the initial content as split into the two data chunks and placed into the two columns. As shown in FIG. 5, splitting the 1,198,399 raw data samples (the initial content) into a first data chunk that includes seven digits (data units) and a second data chunk that includes five digits (data units) results in a total of 142,953 distinct or unique data chunks included in two columns in a database utilizing 6,760 kB of space.

In the example shown in FIG. 5, splitting the 1,198,399 raw data samples (the initial content) into a first data chunk that includes seven digits (data units) and a second data chunk that includes five digits (data units) results in the most efficient compression of the 1,198,399 raw data samples (the initial content), resulting in a compression factor of approximately 2.6. The improved compression factor is determined by comparing the amount of space used to store a compressed number of distinct or unique sixteen digit data values for the 1,198,399 raw data samples in a single column (table entry 524) to the amount of space used to store a compressed number of distinct or unique seven digit values for the 1,198,399 raw data samples in column 1 and five digit values for the 1,198,399 raw data samples split into two chunks and stored in two columns (table entry 532).

Row 506a shows that storing the complete twelve digit raw data sample (the initial content) in a single column results in a maximum possibility of $10^{12}$ distinct or unique data chunks in the column. Row 506f shows that splitting the twelve digit raw data samples (the initial content) into a first data chunk that includes seven digits (data units) and a second data chunk that includes five digits (data units) for storing in two columns results in a maximum possibility of $10^5$ distinct or unique data chunks in column 2 and a maximum possibility of $10^7$ distinct or unique data chunks in column 1. The maximum number of possible distinct or unique data chunks for storing a representation of the complete twelve digit data sample (the initial content) decreases from $10^{12}$ (1,000,000,000,000) distinct or unique data chunks needed for storing the complete twelve digit raw data sample (the initial content) to $10^7+10^5$ (10,000,000+100,000=10,100,000) distinct or unique data chunks for storing a two part representation of the complete twelve digit data sample (the initial content).

Though FIG. 5 is an example showing splitting initial content into content portions that can be stored in storage elements configured as columns in a database, as described, initial content can be split into content portion that can be stored in memory or other types of storage media or devices as described herein.

Figure 6:
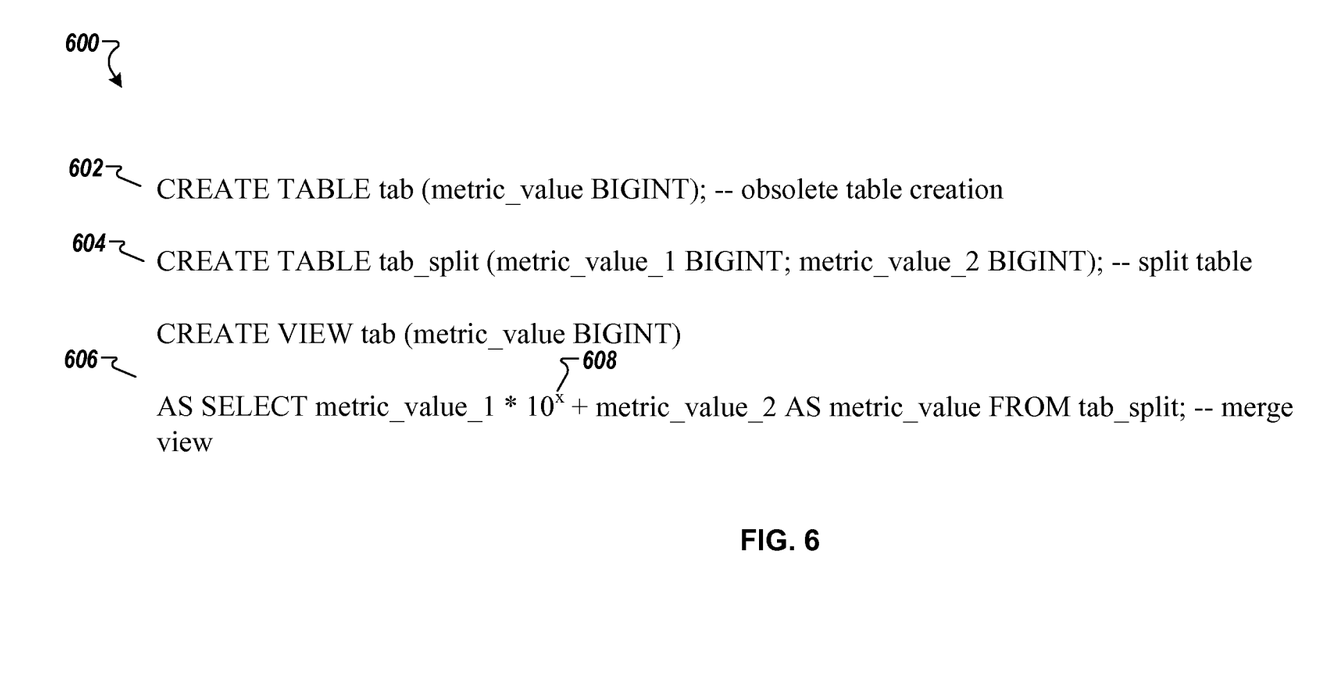
FIG. 6 shows an example of sample programming code that can create a table that includes split data entries in a data record and that can create a table view for use by an application accessing the initial data entries in the table.

FIG. 6 shows an example of sample programming code 600 that can create a table that includes split data entries in a data record and that can create a table view for use by an application accessing the data entries in the table. Referring to FIG. 6, line 602 is sample programming code for creating a table that includes a single column that holds an entire, complete data entry (initial content) (e.g., column metric_value of data type BIGINT).

Line 604 is sample source code for creating a split table for data entries that includes multiple columns (e.g., two columns: metric_value_1 and metric_value_2) for each data entry, splitting a data entry (initial content) into two data chunks of the same data type (e.g., BIGINT) as the data type of the original data entry (the initial content) (e.g., BIGINT). Line 606 is sample programming code that creates a table view that combines (sums or concatenates) split data entries (data chunks) included in the columns in the second table (e.g., column metric_value_1 and column metric_value_2) to form the data entries as originally provided to the database (the initial content) (e.g., metric_value). A value for "x" (reference designator 608) included in the sample programming code in line 606 can be determined based on the number of data units included in the data chunks.

For example, referring to FIG. 4A, the initial content 402h (9,990,200) is split into two four-digit (two four data unit) data chunks 418, 420. The first data chunk 418 (the first content portion) includes the first four digits (the first four data units (0990)) of the eight-digit (eight data unit) initial content 402h. The second chunk 420 (the second content portion) includes the second four digits (the second four data units (0300)) of the eight-digit (eight data unit) initial content 402h. Referring to line 604, and the example of FIG. 4A, a value for "x" (reference designator 608) can be four. Combining the two four-digit data chunks 418, 420 to generate the original eight-digit (eight data unit) initial content 402h based on the sample programming code in line 604 results in adding 9,900,000 (the value "0990" included in the first data chunk 418 multiplied by $10^x$ where x is equal to four (0990×1000=09,900,000) to the value "0300" included in the second data chunk 420.

In some implementations, when combining the two four-digit data chunks 418, 420 to generate the eight-digit initial content, the second data chunk 420 can be concatenated to the first data chunk 418.

The summation or concatenation that is performed by the table view when providing a data entry to an application or function may use one or more computer system resources. The use of the one or more computer system resources may impact a response time of a computer system that includes the in-memory database. Reading the split data entry may slow down a response time of the computer system when reading the data. In some cases, the impact on the response time may be problematic for retrieval of hot data that needs to be accessed from an in-memory database. For example, hot data can be data that needs to be accessed frequently. In another example, hot data can be data that is business-critical that needs to be access quickly. In some cases, the impact on the response time may not be problematic for retrieval of cold data from a database. For example, cold data can be data that is accessed less frequently than hot data. In another example, cold data may be data that does not need to be accessed as quickly and/or as frequently as hot data. In most cases, historical data may not be considered hot data but may be considered cold data. In these cases, the impact on the response time of the computer system may be acceptable in order to obtain the benefits of the compression of the data entries on the in-memory database.

Figure 7:
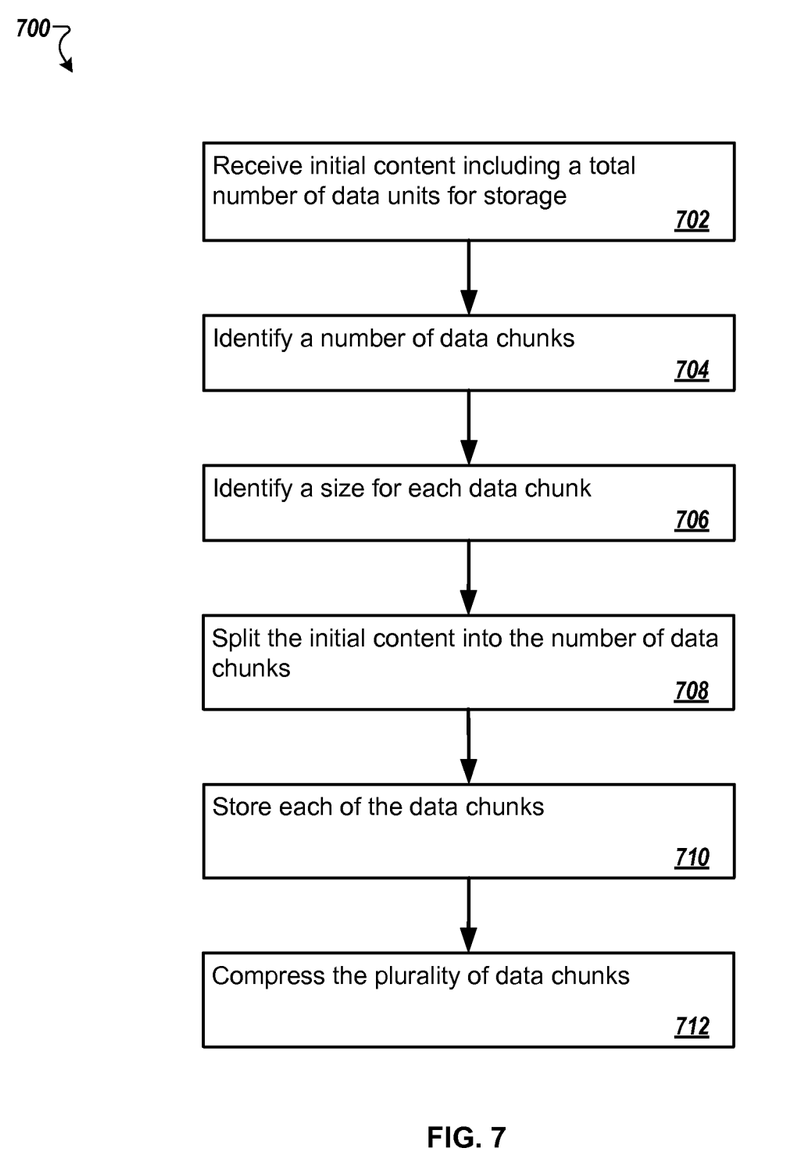
FIG. 7 is a flowchart that illustrates a method for splitting content and compressing content portions in memory.

FIG. 7 is a flowchart that illustrates a method 700 for splitting content and compressing content portions. In some implementations, the systems and processes described herein can implement the method 700. For example, the method 700 can be described referring to FIGS. 1, 2A-B, 3, 4A-B, 5, and 6.

A initial content including a total number of data units for storage is received (block 702). For example, referring to FIG. 1, data gathered or captured by the computing device 106 can be stored in data records 150 included in the memory 144 or in the data records 112 included in the database 108. The data can include initial content. For example, the initial content can include twelve digits (twelve data units) as described with reference to FIG. 5. A database management system (e.g., the database management system 148) can manage the data included in the memory or on secondary storage.

A number of data chunks is identified (block 704). A size of each data chunk is identified (block 706). For example, referring to FIG. 5, the original twelve digit raw data values (the initial content) are split into two data chunks. A first data chunk includes seven digits (data units) and a second data chunk includes five digits (data units). As described with reference to FIG. 5, identifying a first chunk size of seven data units and a second chunk size of five data units is based on determining that splitting a raw data sample of 1,198,399 data entries (an initial content) that includes twelve digits (data units) into two data chunks of seven digits (data units) and five digits (data units) to be placed in two columns, respectively, and then compressing each column results in a minimum amount of database storage usage.

The initial content is split into the number of data chunks (block 708). For example, referring to FIG. 5, the initial content can be split into two data chunks that include a first data chunk and a second data chunk. The first data chunk includes seven data units and the second data chunk includes five data units. Each of the data chunks is stored in memory or on secondary storage (block 710).

The plurality of data chunks are compressed (block 712). For example, referring to FIG. 5, by identifying duplicate data chunks the data chunks included in the first column can be compressed. By identifying duplicate data chunks included in the second column the data chunks in the second column can be compressed.

Figure 8:
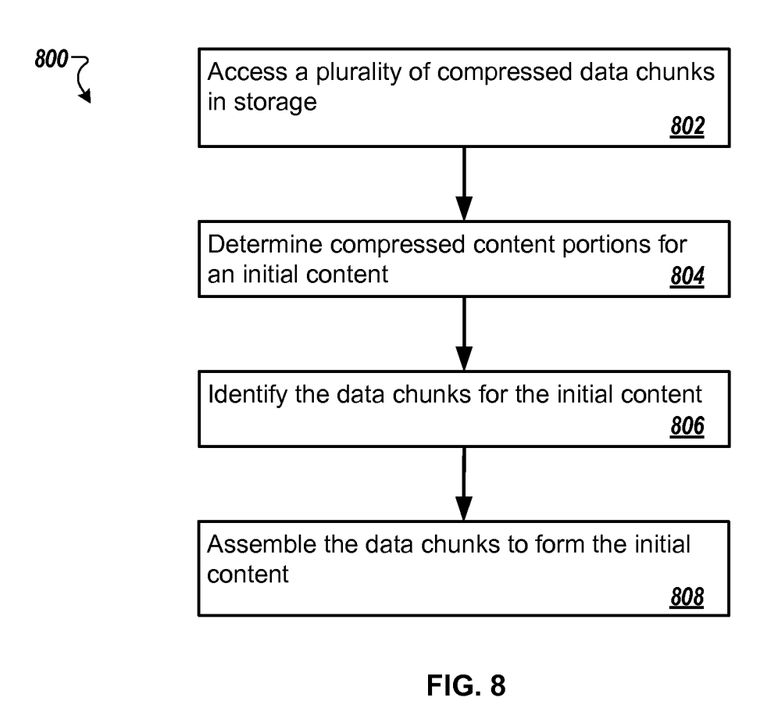
FIG. 8 is a flowchart that illustrates a method for decompressing content portions and assembling/recombining the content portions in order to generate an initial content.

FIG. 8 is a flowchart that illustrates a method 800 for decompressing content portions and assembling/recombining the content portions in order to generate an initial content. In some implementations, the systems and processes described herein can implement the method 800. For example, the method 800 can be described referring to FIGS. 1, 2A-B, 3, 4A-B, 5, and 6.

A plurality of compressed data chunks in storage are accessed (block 802). For example, referring to FIG. 5, the initial content was split into a first data chunk and a second data chunk. Each of the data chunks was stored in memory or on secondary storage. Compressed content portions for an initial content are determined (block 704). For example, the stored single data entry for the duplicate data entries included an additional entry (e.g., a map) indicative of a position in the database (e.g., a pointer to the position in the database) for each of the individual duplicate data entries, and therefore, the initial content. The data chunks for the initial content are identified (block 806). The data chunks are assembled to form the initial content (block 808). For example, referring to FIG. 6, a table view can combine (sum or concatenate) the data chunks to form the initial content.

Though some of the processes, systems and techniques described herein may be described with reference to an in-memory database, the same or similar processes, systems, and techniques can be applied to on-disk database systems. In addition, though some of the processes, systems and techniques described herein may be described with reference to a database, the same or similar processes, systems, and techniques can be applied to any type of memory storage system or device as described herein.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
   receiving initial content including a total number of data units for storage;
   identifying a number of data chunks;
   identifying a size for each of the data chunks, the size for each data chunk indicative of a number of data units for inclusion in the respective data chunk;
   splitting the initial content into the number of data chunks, each data chunk including a portion of the total number of data units included in the initial content, the portion of the total number of data units based on the size of the data chunk;
   storing each of the data chunks in memory in a column associated with a respective data chunk, each column including a plurality of data chunks of the identified data chunk size for the data chunk associated with the respective column; and
   compressing the data chunks included in the memory.

2. The method of claim 1,
   wherein compressing the data chunks included in the memory comprises, for each column, compressing the plurality of data chunks included in the column.

3. The method of claim 1, wherein the memory is an in-memory database.

4. The method of claim 1, further comprising:
   creating a table view for the data chunks.

5. The method of claim 4, further comprising:
   accessing each data chunk for the initial content; and
   combining each data chunk for the initial content, using the table view, to generate the initial content.

6. The method of claim 1, wherein a sum of the number of data units included in each data chunk is equal to the total number of data units included in the initial content.

7. The method of claim 1, wherein compressing the data chunks comprises:
   identifying duplicate data chunks;
   storing a single data entry for each duplicate data chunk; and
   storing an additional data entry indicative of a position in the memory for each duplicate data chunk.

8. The method of claim 1, wherein identifying a number of data chunks is based on determining that the number of data chunks results in a minimum amount of storage in the memory.

9. A computer program product, the computer program product being tangibly embodied on a non-transitory computer-readable storage medium and comprising instructions that, when executed by at least one computing device, are configured to cause the at least one computing device to:
   receive initial content including a total number of data units for storage in memory;
   identify a number of data chunks;
   identify a size for each of the data chunks, the size for each data chunk indicative of a number of data units for inclusion in the respective data chunk;
   split the initial content into the number of data chunks, each data chunk including a portion of the total number of data units included in the initial content, the portion of the total number of data units based on the size of the data chunk;

store each of the data chunks in memory in a column associated with a respective data chunk, each column including a plurality of data chunks of the identified data chunk size for the data chunk associated with the respective column; and compress the data chunks included in the memory.

10. The computer program product of claim 9, wherein the instructions configured to cause the at least one computing device to compress the data chunks included in the memory comprise instructions configured to cause the at least one computing device to, for each column, compress the plurality of data chunks included in the column.

11. The computer program product of claim 9, wherein the memory is an in-memory database.

12. The computer program product of claim 9, wherein the instructions are further configured to cause the at least one computing device to create a table view for the data chunks.

13. The computer program product of claim 12, wherein the instructions are further configured to cause the at least one computing device to:

access each data chunk for the initial content; and combine each data chunk for the initial content, using the table view, to generate the initial content.

14. The computer program product of claim 9, wherein a sum of the number of data units included in each data chunk is equal to the total number of data units included in the initial content.

15. The computer program product of claim 9, wherein the instructions for compressing the data chunks cause the at least one computing device to:

identify duplicate data chunks;

store a single entry for each duplicate data chunk; and store an additional data entry indicative of a position in the memory for each duplicate data chunk.

16. A database management system comprising:

a splitting module configured to:

split initial content into a number of data chunks, each data chunk including a portion of a total number of data units included in the initial content, the portion of the total number of data units based on a size of the data chunk, the size of the data chunk indicative of a number of data units for inclusion in the data chunk;

a memory configured to:

store each of the data chunks in a column associated with a respective data chunk, each column including a plurality of data chunks of the identified data chunk size for the data chunk associated with the respective column; and a compression module configured to:

compress the data chunks included in the memory.

17. The system of claim 16, wherein the memory is further configured to, for each column, compress the plurality of data chunks included in the column.

18. The system of claim 16, further comprising a decompression module configured to create a table view for the data chunks.

19. The system of claim 18, further comprising an assembly module configured to:

access each data chunk for the initial content; and combine each data chunk for the initial content, using the table view, to generate the initial content.

20. The system of claim 16, wherein compressing the data chunks comprises:

identifying duplicate data chunks;

storing a single data entry for each duplicate data chunk; and storing an additional data entry indicative of a position in the memory for each duplicate data chunk.

\* \* \* \* \*